Patented Jan. 6, 1953

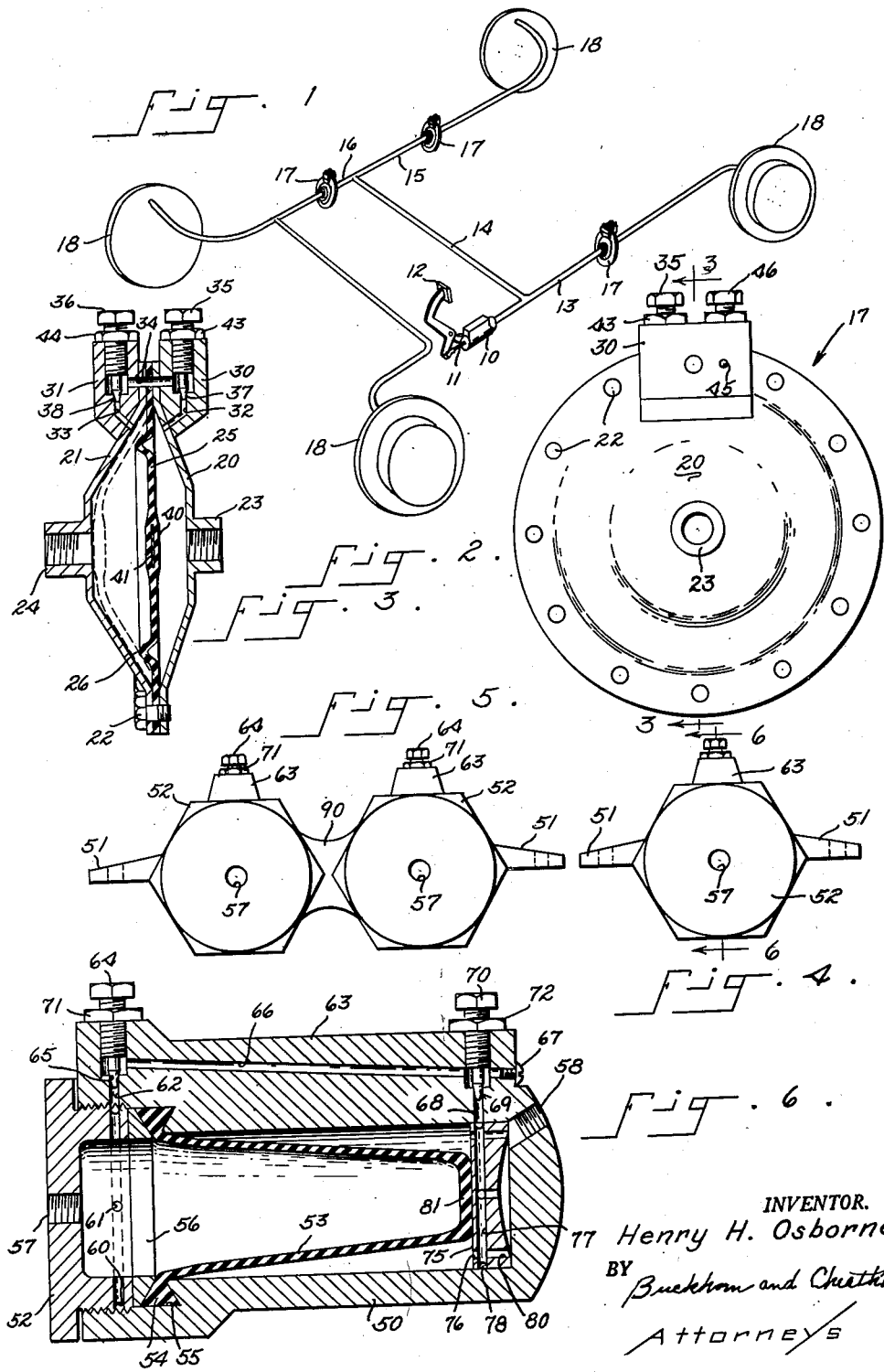

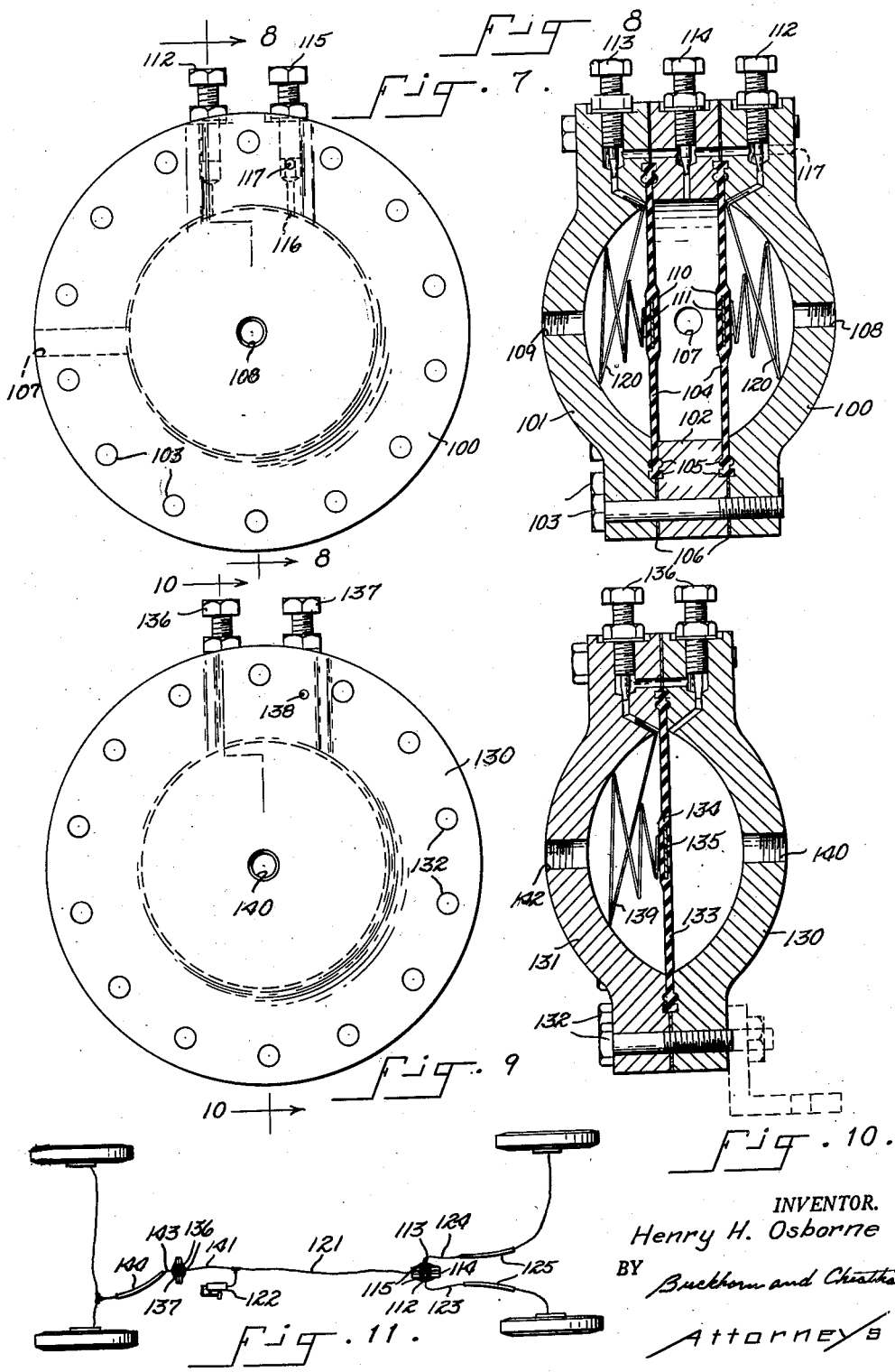

2,624,176

UNITED STATES PATENT OFFICE 2,624,176

SAFETY DEVICE FOR VEHICLE BRAKE SYSTEMS

Henry H. Osborne, Gresham, Oreg., assignor to Leo M. Jansen, Gresham, Oreg.

Application April 10, 1950, Serial No. 155,005

3 Claims. (Cl. 60—54.5)

The present invention comprises an improved safety device for insertion in a hydraulic brake system of the type including a master cylinder from which conduits lead to individual braking mechanisms associated with the wheels of the vehicle, the safety device being of improved construction whereby mechanical failures heretofore encountered in such devices are to a large part eliminated. All such devices heretofore known to me comprise some form of floating piston or related mechanism, many of which have been known to fail to operate, with the result that the brakes may not be set with the speed required in an emergency, or the loss of a large proportion of the fluid used in the brake system. The present invention comprises a flexible diaphragm which cannot become lodged or otherwise held against movement and which cannot permit excessive loss of fluid from the system.

The objects and advantages of the present invention will be more readily ascertained from inspection of the following specification taken in connection with the accompanying drawing wherein like numerals refer to like parts throughout, while the features of novelty will be more distinctly pointed out in the appended claims.

In the drawing,

Fig. 1 is a schematic view of a preferred arrangement of hydraulic brake system employing the present invention;

Fig. 2 is a side elevation of one form of the present invention;

Fig. 3 is a vertical section taken substantially along line 3—3 of Fig. 2;

Fig. 4 is an end elevation of a modified form of the present invention;

Fig. 5 is an end elevation of a further modification of the present invention;

Fig. 6 is a vertical section taken substantially along line 6—6 of Fig. 4;

Fig. 7 is a side view of a further modification of the invention in dual unit form;

Fig. 8 is a section taken substantially along line 8—8 of Fig. 7;

Fig. 9 is a side view of a single unit similar to the dual unit of Fig. 7;

Fig. 10 is a section taken substantially along line 10—10 of Fig. 9; and

Fig. 11 is a schematic view of a vehicle having the safety devices of Figs. 7 and 9 thereon.

A hydraulic brake system on an automotive vehicle is schematically illustrated in Fig. 1 wherein it is seen that a master cylinder 10 is associated with an operating plunger 11 pivotally connected to the brake pedal 12. A conduit system including lines 13, 14, 15 and 16 connects the master cylinder 10 to the input side of a plurality of safety devices 17 formed in accordance with the present invention, which are interposed between the master cylinder and the braking mechanisms indicated at 18. Preferably there is one such safety device associated with each of the rear wheels of the vehicle and a third safety device associated with the front pair of wheels of the vehicle in order that failure of the conduits leading from the safety devices to the wheels may not result in loss of fluid from the entire system, there being but a single safety device associated with the front pair of wheels in order that steering control may not be lost if one or the other front wheel braking mechanism should lose its fluid.

One form of the present invention is illustrated in Figs. 2 and 3 wherein it is seen that the safety device comprises a pressure chamber formed by a pair of flanged shells 20 and 21 which are connected together along their peripheries by a plurality of short studs 22. The shell 20 is provided with an internally threaded, central nipple 23 for connection with an inlet conduit leading from the master cylinder, and the shell 21 is provided with a centrally disposed, threaded nipple 24 for connection to the conduit leading to the associated braking mechanism. The interior of the pressure chamber is divided into two separate compartments by a flexible disc diaphragm 25, the periphery of which is clamped between the flanged portions of the shells and is provided with a plurality of openings for the passage of studs 22. The diaphragm is formed of suitable impervious, flexible material inert to the braking fluid and may be provided with a peripheral fold 26 in order that flexing without rupturing may be accomplished.

Means are associated with the shells 20 and 21 for providing a passage by-passing the diaphragm, such means comprising a pair of blocks 30 and 31 welded to the upper, outer surfaces of the shells. A by-pass passage including the portions 32, 33 and 34 may lead fluid from one side of the diaphragm to the other side, the passage normally being closed by a pair of needle valves 35 and 36 threadedly mounted in the members 30 and 31 respectively, the inner ends thereof being normally seated in valve seats 37 and 38 respectively, formed in the by-pass passage so that the two compartments of the pressure chamber are normally maintained against communication with each other. It is to be appreciated that only one valve need be provided, but two valves may be provided as shown for additional safety. If only one valve is provided one of the two members 35 and 36 would be an ordinary stud for closing the drilling hole.

The blocks 30 and 31 are provided with a second passage similar to the by-pass passage 32, 33, 34, constituting an air bleeding passage which is provided with opposed vent openings 45. A pair of needle valves 46 are arranged to seal the air bleeding passage similarly to valves 35 and 36.

When a leak or break occurs in the fluid system it is invariably located near the wheel so that a safety device as arranged in Fig. 1 will prevent loss of fluid from the entire system. Usually leakage is slow so that the loss becomes obvious before a serious accident results, but if it should be rapid entire braking control will not be lost because of the safety device. There is usually a reserve supply of oil in the master cylinder 10, which may be sent into the system by pumping the foot pedal several times. This will cause the diaphragm to be displaced until its movement is blocked, whereupon braking pressure may be applied to the remaining operative wheels.

After the leak has been repaired the system may be refilled by opening the by-pass and bleed valves and pumping the brake pedal slowly while pouring fluid into the master cylinder. When oil runs from the vent opening on the near side, its associated bleeding valve may be closed and pumping continued until oil runs from the vent opening on the far side. At this time the safety device is filled and both bleeding valves may be closed, but the by-pass must remain open. The usual vent valve in the brake assembly should now be opened and the operation continued until all air is driven from the system, whereupon all valves should be closed.

The flexible diaphragm is preferably provided with a centrally disposed, thickened portion 40 in which is imbedded a metal disc 41. In the event of a break in a line leading from the safety device the diaphragm will lie against the sides of the device as shown in dash lines, and the disc 41 will prevent the pressure from rupturing the diaphragm opposite the outlet opening.

In Figs. 4 and 6 there is illustrated a modified form of the present invention in which the pressure chamber comprises an elongated, cup-shaped shell 50 which is preferably provided with apertured side wings 51 suitable for mounting the safety device on the chassis of the vehicle, and a flanged nut 52 threadedly engaged in the threaded, open end of the cup. The interior of the pressure chamber is divided into separate compartments by a resilient, cup-shaped diaphragm 53 provided with a flange 54 at its mouth, the flange expanding outwardly from the cup so as to provide means for anchoring the cup in a suitably formed, annular recess 55 spaced slightly inwardly from the threaded mouth of the member 50. The flange is clamped in the recess 55 by a suitably formed ring 56 which is engaged by the inner end of the closure nut 52. The nut 52 is provided with a threaded, central aperture 57 by means of which an inlet conduit may be connected to the pressure chamber, and the bottom of the member 50 is provided with a threaded outlet opening 58. The cup-shaped diaphragm 53 tapers toward its base so as to divide the substantially cylindrical interior of the member 50 into two separate compartments which are normally maintained against communication with each other by the diaphragm.

The exterior of the threaded portion of the nut 52 is provided with an annular recess 60 with which communicates a plurality of radially extending apertures 61 in order that communication may be established with a portion 62 of a by-pass passage extending through a longitudinal flange 63 on the top of the member 50. A threaded needle valve 64 is threadedly retained in the member 50, the inner end thereof being tapered to seat in a valve seat 65 formed in the upper end of passage 62. A longitudinally extending bore 66 drilled through the flange 63 and sealed by a screw 67 connects passage 62 with a second radial passage 68 adjacent the bottom of the member 50, the passage 68 having a valve seat 69 for reception of the tapered lower end of a second needle valve 70 threadedly mounted in the flange 63. Lock nuts 71 and 72 are preferably provided to retain the needle valves in closed position.

In order that expansion of the cup-shaped diaphragm 53 shall take place solely within the confines of the side walls thereof, the bottom of the diaphragm preferably rests against a disc 75 seated in the bottom of the member 50, the disc having a plurality of perforations 76 in its forward surface communicating with a passage 77 leading through the interior of the disc and connecting with an annular groove 78 which communicates with the passage 68. The passage 77 also communicates with a plurality of rearwardly extending perforations 80 which lead to the concave inner surface of the disc so as to provide an open space communicating with the outlet passage 58. The perforations and passages through the disc 75 provide means for permitting the application of pressure to the braking mechanism upon expansion of the sidewalls of the cup-shaped member 53, and also permit communication from one side to the other side of the diaphragm when the needle valves are open.

The bottom wall 81 of the diaphragm is preferably substantially thicker than the side wall and the thickening thereof preferably extends upwardly into the side walls for a short distance so as to provide extra strength at the points where extreme flexing might occur. However, most of the expansion of the side wall of the diaphragm will occur well up toward the flange 54 during normal operation of the braking system.

It is contemplated that the units illustrated in Fig. 4 may be supplied singly or that the rear wheels may be served by a dual unit as illustrated in Fig. 5 wherein a pair of cup-shaped members identical with the single cup-shaped member illustrated in Figs. 4 and 6 are closed by a pair of nuts 52, the dual unit having lateral wings 51 for mounting purposes and being connected by a web 90. The elongated, relatively cylindrical form of pressure chamber illustrated in Figs. 4 and 6 adapts itself more readily to association with the vehicle than the large disc forms illustrated in Figs. 2 and 3, in some types of vehicles, and vice versa.

In this form of safety device no vents are necessary since the outlet 58 is at the top of the chamber and all air will be driven from the outlet and may be bled out at the brake mechanism. Similarly, any air which may have entered the inlet side will be removed through the passage 62 located at the top of the chamber.

Figs. 7 and 8 illustrate a modified form of diaphragm safety device for insertion in the line leading to the rear wheels of the vehicle. In this form a pair of substantially identical shells 100 and 101 are mounted at the opposed sides of a central annular member 102, the same being retained in assembled relation by a plurality of studs 103. The interior of the space so provided is divided into three compartments by a pair of identical flexible diaphragms 104 made of resilient material such as a rubber substitute. The diaphragms are preferably provided with peripheral beads indicated at 105 which are clamped in annular grooves in the opposed faces of the members 100, 101 and 102 so as to be anchored against displacement when pressure is applied to the interior of the device. Preferably gaskets 106 are positioned between the members beyond the outer edges of the diaphragms. The central member 102 is provided with an inlet opening 107 and each of the members 100 and 101 is provided with an outlet opening 108 and 109, respectively, leading to the individual brake mechanisms. The central portion of each of the diaphragms is thickened as indicated at 110 and a metallic disc 111 is imbedded in the thickened portion to prevent rupturing of the diaphragm if it should be displaced and pressed against the interior surface of the safety device.

Each of the members 100, 101 and 102 is provided with an upwardly extending passage leading from the extreme top portion of the interior space and terminating in an upwardly facing valve seat with which cooperates a needle valve 112, 113 and 114, respectively, and each of the drill holes in which the needle valves are seated is connected to its neighbor through a laterally extending opening forming a portion of a by-pass passage as previously described with respect to Figs. 2 and 3. Alongside of the by-pass valves there are located a pair of air bleeding valves 115, one of which communicates with the top of the compartment defined by the member 100 and the diaphragm adjacent thereto through an opening 116, and one of which communicates with the compartment defined by the member 101 and the diaphragm adjacent thereto through a corresponding opening so that each of the exterior compartments may be vented to the atmosphere through an air bleeding passage extending through the side of member 100 as indicated at 117. In order to be certain that the diagram will return to the position illustrated in Fig. 8, a wire spring 120 is mounted between the diaphragm and the adjacent outer member, the spring being in the form of a spiral helix with its smaller end resting against the thickened portion 110 of the diaphragm and its larger end resting against the outer member, the free end thereof being anchored in one of the openings leading to one of the valves.

When this form of the invention is mounted on a vehicle as shown in Fig. 11, the opening 107 is connected to a tube 121 leading from the master cylinder 122, the opening 108 is connected to a tube 123 leading to one of the rear wheels, and the opening 109 is connected to a tube 124 leading to the other rear wheel. Flexible inserts in the tubes are indicated at 125, and it is at one of these inserts that leakage in the system usually occurs. If a leak should occur the outlet compartment would be drained because of the pressure intermittently applied to the interior compartment. However, as soon as the diaphragm became seated against the interior wall of the safety device and the foot pedal operated once or twice to refill the system from the reserve supply of the master cylinder, pressure could be applied to the other braking mechanism. After the break is repaired refilling and venting of the system would be accomplished as previously described.

Figs. 9 and 10 illustrate a single unit formed as described with respect to the dual unit of Figs. 7 and 8. In this form a pair of members 130 and 131 are joined together by studs 132 and divided into an inlet compartment and an outlet compartment by diaphragm 133 as previously described. The diaphragm is provided with a thickened central portion 134 to prevent rupturing, which portion is reinforced by a metal disc 135. By-pass valves 136 are provided as previously described, and at least one vent valve 137 is provided, the same controlling an air bleeding outlet 138. A spring 139 is preferably provided to insure return of the diaphragm to its central position. The member 130 is provided with an inlet opening 140 which is connected to tube 141 leading to the master cylinder, and the member 131 is provided with an outlet opening 142 which is connected to the tube 143 from which branches lead to the front wheel braking mechanisms and in which a flexible insert 144 is provided. The operations of filling and venting of this form are exactly as previously described.

Having illustrated and described preferred embodiments of my invention, it should be apparent to those skilled in the art that the invention permits of modification in arrangement and detail. I claim as my invention all such modifications as come within the true spirit and scope of the appended claims.

I claim:

1. A safety device for insertion in a hydraulic brake system of the type including a master cylinder from which conduits lead to individual braking mechanisms associated with the wheels of a vehicle, comprising a pressure chamber having an inlet for communication with the master cylinder and an outlet for communication with one of the braking mechanisms, a flexible diaphragm dividing said pressure chamber into two separate compartments which are normally maintained against communication with each other, means providing a passage by-passing said diaphragm for interconnecting said compartments, said passage being formed to provide a pair of valve seats, a pair of needle valves cooperatively associated with said valve seats whereby communication between said compartments may be established, said pressure chamber comprising a cup-shaped shell having a threaded open end and a threaded closure member mounted in said open end, said diaphragm comprising a cup-shaped, resilient member having an external flange at its open end, said shell having an internal, annular seat adapted to receive said flange, a washer interposed between said flange and said closure member to clamp said flange against said seat, and a perforated disc interposed between the bottom of said shell and the bottom of said resilient member, said outlet being in the bottom of said shell.

2. A safety device for insertion in a hydraulic brake system of the type including a master cylinder from which conduits lead to individual braking mechanisms associated with the wheels of a vehicle, comprising a pressure chamber having an inlet for communication with the master cylinder and an outlet for communication with one of the braking mechanisms, a flexible diaphragm dividing said pressure chamber into two separate compartments which are normally maintained against communication with each other, means providing a passage by-passing said diaphragm for interconnecting said compartments, valve means normally closing said bypass passage, and a perforated member inserted in said pressure chamber between said flexible diaphragm and said outlet, said perforated member permitting free passage of hydraulic fluid from said chamber but protecting said flexible diaphragm from being forced into the outlet from said chamber.

3. A safety device for insertion in a hydraulic brake system of the type including a master cylinder from which conduits lead to individual braking mechanisms associated with the wheels of a vehicle, comprising a pressure chamber having an inlet for communication with the master cylinder and an outlet for communication with one of the braking mechanisms, a flexible diaphragm dividing said pressure chamber into two separate compartments which are normally maintained against communication with each other, means providing a passage by-passing said diaphragm for interconnecting said compartments, valve means normally closing said bypass passage, and a perforated member inserted in said pressure chamber between said flexible diaphragm and said outlet, said perforated member permitting free passage of hydraulic fluid from said chamber but protecting said flexible diaphragm from being forced into the outlet from said chamber, said perforated member comprising means spacing the surface thereof from the surface of said chamber whereby fluid may flow freely through said outlet upon being forced from said chamber.

HENRY H. OSBORNE.

REFERENCES CITED

The following references are of record in the file of this patent:

UNITED STATES PATENTS

| Number | Name | Date |
|---|---|---|
| 2,061,763 | Gilstrap et al. | Nov. 24, 1936 |
| 2,097,889 | Miller | Nov. 2, 1937 |
| 2,246,621 | Davis | June 24, 1941 |

FOREIGN PATENTS

| Number | Country | Date |
|---|---|---|
| 328,943 | Great Britain | May 5, 1930 |